US007685223B1

(12) United States Patent  (10) Patent No.: US 7,685,223 B1
Basavaiah et al. (45) Date of Patent: Mar. 23, 2010

(54) NETWORK-WIDE SERVICE DISCOVERY

(75) Inventors: Murali Basavaiah, Sunnyvale, CA (US);
Arpakorn Boonkongchuen, San Jose, CA (US); Subramaniam Venkata Kalambur, Bangalore (IN); Magesh Sampath Iyengar, Madhya Pradesh (IN)

(73) Assignee: Cisco Technology, Inc., San Jose, CA (US)

( * ) Notice: Subject to any disclaimer, the term of this patent is extended or adjusted under 35 U.S.C. 154(b) by 1046 days.

(21) Appl. No.: 11/368,096

(22) Filed: Mar. 2, 2006

(51) Int. Cl.
*G06F 15/16* (2006.01)
(52) U.S. Cl. .................. 709/200; 709/203; 709/223; 709/226
(58) Field of Classification Search .......... 709/200, 709/203, 220, 221, 223, 226
See application file for complete search history.

(56) References Cited

U.S. PATENT DOCUMENTS

| 6,614,781 | B1 | 9/2003 | Elliot et al. | |
|---|---|---|---|---|
| 6,621,895 | B1 | 9/2003 | Giese et al. | |
| 6,728,267 | B1 | 4/2004 | Giese et al. | |
| 7,174,371 | B2 | 2/2007 | Elo et al. | |
| 7,203,730 | B1 * | 4/2007 | Meyer et al. | 709/213 |
| 2006/0045098 | A1 * | 3/2006 | Krause | 370/396 |
| 2006/0271677 | A1 * | 11/2006 | Mercier | 709/224 |

OTHER PUBLICATIONS

Peterson, D., "*Finding Fibre Channel over TCP/IP (FCIP) Entities Using Service Location Protocol*" version 2 (SLPv2), RFC 3822, Jul. 2004, pp. 1-10.

Monia, C. et al., "*The IPv4 Dynamic Host Configuration Protocol (DHCP) Option for the Internet Storage Name Service*," RFC 4174, Sep. 2005, pp. 1-12.

Tseng, J. et al., "*Internet Storage Name Service*" RFC 4171, Sep. 2005, pp. 1-108.

* cited by examiner

*Primary Examiner*—Salad Abdullahi
*Assistant Examiner*—El Hadji M Sall
(74) *Attorney, Agent, or Firm*—Weaver Austin Villeneuve & Sampson LLP

(57) ABSTRACT

Disclosed are methods and apparatus for network wide discovery of service ports of a gateway device in a storage area network (SAN) that are available for use by hosts on a first particular network segment, for example, for accessing storage devices in the SAN. The hosts of the first Internet Protocol (IP) network segment implement an IP and not a fiber channel protocol, while devices in the SAN (and possibly other hosts on other network segments) implement a fiber channel protocol. The particular network segment may also be isolated from other network segments that are each in communication with a different gateway device or set of service ports than the first network segment. In general, available ports are discovered with respect to a particular network segment, such as the first network segment. That is, only the service ports that are capable of communication with the first network segment are discovered to be available for the hosts of such first network segment. Other service ports are not capable of communication with the first network segment. For example, these service ports are configured to communicate with another network segment that is isolated from the first network segment. These other service ports are not discovered to be available to hosts on the first network segment.

14 Claims, 6 Drawing Sheets

NETWORK-WIDE SERVICE DISCOVERY

BACKGROUND OF THE INVENTION

The present invention relates to storage area networks (SANs). More particularly, it relates to discovery of available service ports that allow access to SAN devices by hosts in an Internet Protocol (IP) network.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

FIG. 1 is a diagrammatic representation of a storage area network 102 that implements a fibre channel (FC) protocol in communication with a plurality of hosts 110 which implement an internet protocol (IP). The storage area network 102 includes a target 106 in communication with switch 104. A service for an IP host to access a target of a SAN is typically set up on a port of a gateway switch. As shown, switch 104 is in the form of a gateway device having a plurality of service ports 108 that each provide a service for an IP host to communicate with an FC target, such as target 106.

For a particular host 110 to be able to communicate with target 106, the host must be configured with the identity of a service port of the gateway device 104. For example, host 110a is configured with the identity of service port 108a. In contrast, host 110b may be configured with the identity of service ports 108a and 108b, while host 110c is configured with the identity of service port 108b. In sum, in order for a service port to provide a service to a particular host, the particular host has to know the identity of such service port in order to use it. This knowledge is usually achieved by manual configuration on the host so that the configured host points to a specific service port. The problem with this approach is that while there are multiple ports that can provide service to the host, the host does not know about them so there is no redundancy or load-balancing. Of course, a user can manually configure the host to use multiple ports. However, such configuration is static. That is, if the port for which a host is configured fails, the host may not be configured to access an alternative port and, hence, the host's use of a service may be disrupted. Additionally, when new ports are added, a host has to be manually configured to use a service on such new port.

Accordingly, mechanisms for providing information regarding port availability to a host would be beneficial. Additionally, mechanisms for facilitating a host to dynamically access any available port for a particular SAN service are needed.

SUMMARY OF THE INVENTION

The present invention provides methods and apparatus for network wide discovery of service ports of a gateway device in a storage area network (SAN) that are available for use by hosts on a first particular Internet Protocol (IP) network segment, for example, for accessing storage devices in the SAN. The hosts of the first network segment implement an IP and not a fibre channel protocol, while devices in the SAN (and possibly other hosts on other network segments) implement a fibre channel protocol. The particular network segment may also be isolated from other network segments that are each in communication with a different gateway device or set of service ports than the first network segment. In general, available ports are discovered with respect to a particular network segment, such as the first network segment. That is, only the service ports that are capable of communication with the first network segment are discovered to be available for the hosts of such first network segment. Other service ports are not capable of communication with the first network segment. For example, these service ports are configured to communicate with another network segment that is isolated from the first network segment. These other service ports are not discovered to be available to hosts on the first network segment.

In one embodiment, identifiers for one or more service ports that each provide a service to a host that is outside the SAN are provided at a first gateway device in the SAN so that such host can communicate with one or more devices in the SAN. An availability query is sent from a first service port of the first gateway device to each of the other service ports. For each availability response that is received at the first service port from a one of the other service ports in response to an availability query, the identifier for such responding other service port is stored. When a port query from a particular host is then subsequently received at the first service port, a port response is sent from the first service port to the particular host whereby the port response includes each stored identifier for each responding other service port.

In a first implementation, a first one of the other service ports belongs to the first gateway device and belongs to a same local area network as the first service port, and a second one of the other service ports belongs to a second gateway device and belongs to a different local area network than the first service port. An availability response is received from the first other service port and not from the second other service port. In one aspect, the port response further includes the identifier of the first service port. In a specific implementation, the internet protocol is in the form of the internet small computer system interface (iSCSI) protocol.

In one embodiment, the other service ports are sent sequentially. In an alternative embodiment, the other service ports are sent together in a same message. In one aspect, the identifiers of the responding other service ports are stored in a Port Reachability database that is associated with the first service port. In a further aspect, the identifier of the first service port is also stored in the Port Reachability database. In another aspect, the operations for sending a query from the first service port, handling a response, and handling a query from a host are performed for each of the services ports of the first gateway device. In one implementation, the operations for sending a query from the first service port and handling each response are triggered automatically upon a change in a service port's address. In another aspect, these two operations are triggered automatically upon a change in a service port's state. In another aspect, they are triggered automatically upon a change in a reconfiguration of a redundant router group. In yet another embodiment, these two operations are triggered manually by a user.

In another embodiment, the invention pertains to an apparatus for discovering service ports in a storage area network (SAN). The apparatus includes one or more processors and one or more memory. At least one of the memory and processors are adapted to provide at least some of the above described method operations.

These and other features of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
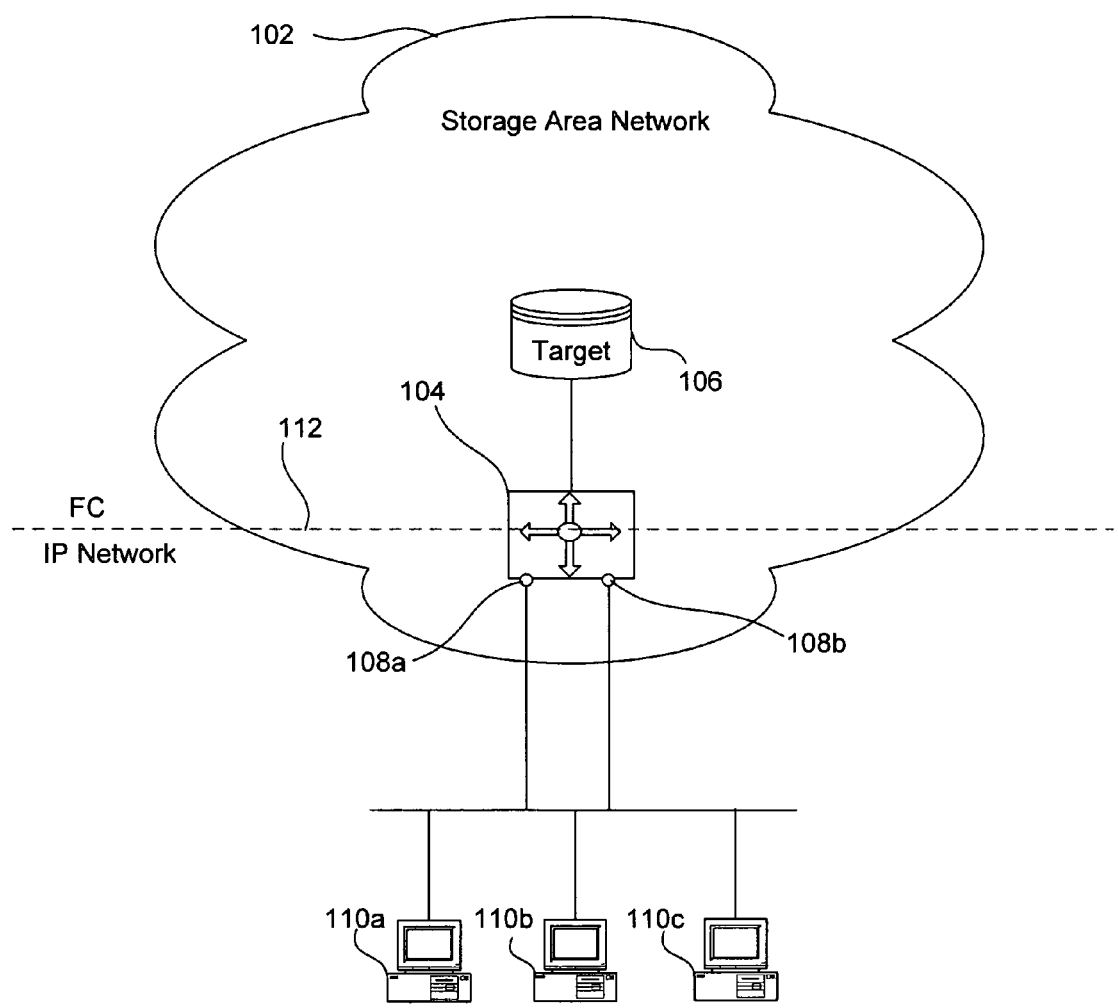
FIG. 1 is a diagrammatic representation of a storage area network that implements a fibre channel (FC) protocol in communication with a plurality of hosts which implement an internet protocol (IP).
Figure 2:
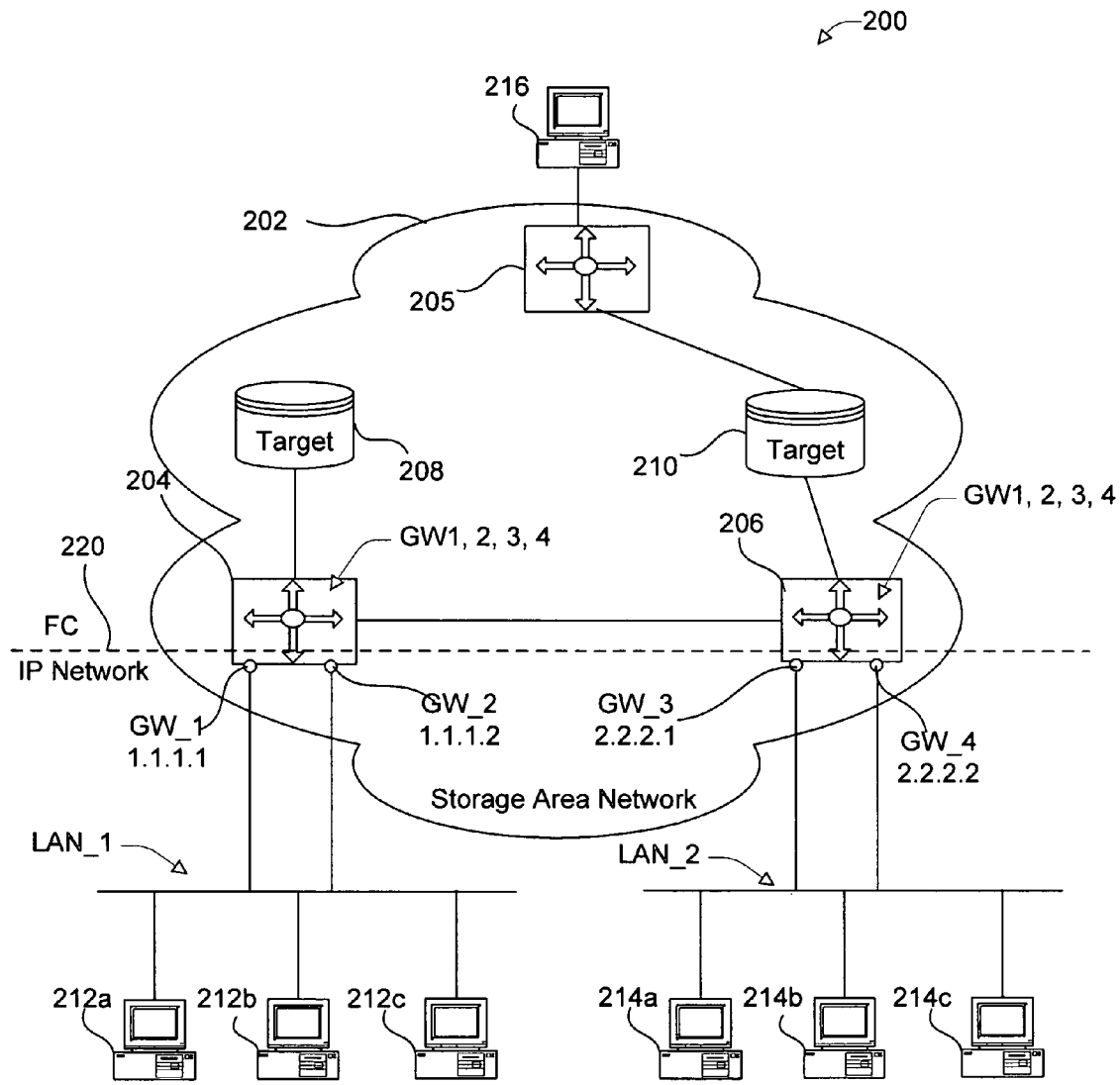
FIG. 2 is a diagrammatic representation of a network in which embodiments of the present invention may be implemented.

FIG. 2 is a diagrammatic representation of a network 200 in which embodiments of the present invention may be implemented. The configuration of FIG. 2 will also be used to illustrate the inventive mechanisms described below. As shown, the network 200 includes a storage area network (SAN) 202 having targets 208 and 210 and switches 204, 205, and 206. A host or server, such as host 216, may communicate with a target, such as target 210, via a switch, such as switch 205. The SAN typically includes additional targets, switches, and hosts or servers; however, these additional devices are not shown so as to not obscure the description of the invention. Of course, FIG. 2 represents merely one example of a SAN fabric in which techniques of the present invention may be practiced. For example, the fabric may include any number of Virtual SANs (VSANs) that include any number and type of host and storage devices or virtual devices, and each VSAN may be coupled to one or more other VSANs.

The devices in the SAN are typically configured to communicate using the fibre channel (FC) protocol. Some of the devices outside the SAN, such as host 216, may also communicate using FC. In Fibre Channel (FC), each device (hosts, storage devices and switches) is identified by a globally unique, eight (8) byte wide World Wide Name (WWN) assigned by the manufacturer. When the Fibre Channel devices are interconnected to form a SAN or VSAN, the WWN (along with other parameters) is the primary mechanism to uniquely identify each device. Fibre Channel frames are used for communication among the devices in the SAN. The WWN, however, is not used by the frames. Each device must login to the FC network and is then dynamically assigned a unique Fibre Channel address (FCID) by the Fabric. The FCID is used in FC networks for end devices to communicate with each other. Each switch and port of each switch will also have an associated WWN and FCID.

In some of the discussion herein, embodiments of this invention are described in terms of the SCSI (Small Computer System Interface) protocol. This is because many storage area networks in commerce run a SCSI protocol to access storage sites. Frequently, the storage area network employs fibre channel (e.g., FC-PH (ANSI X3.230-1994, Fibre channel—Physical and Signaling Interface)) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, this may include SCSI over FC, iSCSI (SCSI over IP), parallel SCSI (SCSI over a parallel cable), serial SCSI (SCSI over serial cable), and all the other incarnations of SCSI.

Because SCSI is so widely used in storage area networks, much of the terminology used herein will be SCSI terminology. The use of SCSI terminology (e.g., "initiator" and "target") does not imply that the describe procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a device that performs an operation requested by an initiator. For example, a target physical memory disk will obtain or write data as initially requested by a host initiator.

Targets may be divided into physical or virtual "logical units." These are specific devices addressable through the target. For example, a physical storage subsystem may be organized in a number of distinct logical units. In this document, hosts view virtual memory as distinct virtual logical units. Sometimes herein, logical units will be referred to as "LUNs." In the SCSI standard, LUN refers to a logical unit number. But in common parlance, LUN also refers to the logical unit itself.

Although some hosts may be set up to communicate using a FC specific protocol such as SCSI, other hosts may utilize another Internet Protocol (IP) protocol, such as iSCSI. As shown, hosts 212 of LAN_1 and hosts 214 of LAN_2 are IP devices. The hosts which utilize IP can communicate with FC devices of the SAN, such as target 208 and 210, via switches 204 and 206 which serve as gateway devices.

Each gateway device includes one or more service ports that translate between a protocol used by a SAN device (e.g., FC or SCSI) and a protocol used by a device external to the SAN. For example, each host and gateway device may utilize iSCSI (the IP version of SCSI or small computer system interface), which is an IP based storage networking standard for linking data storage facilities. iSCSI allows SCSI commands to be carried over an IP network, such a LAN or wide area network (WAN).

Each service port of each gateway device may allow one or more hosts to access a target, depending on which network segments are coupled to each port. In the present example, devices on LAN_1 are communicatively coupled with both services ports GW_1 and GW_2, while devices on LAN_2 are communicatively coupled with both GW_3 and GW_4. In other words, service ports GW_1 and GW_2 of gateway device 204 can provide access to target 208 to hosts 212, while service ports GW_3 and GW_4 of gateway device 206 can provide access to target 210 to hosts 214. In contrast, service ports GW_1 and GW_2 are not available to hosts 214 of LAN_2 and service ports GW_3 and GW_4 are not available to hosts 212 of LAN_1. Hosts are said to be "communicatively coupled" to a particular service port when it can communicate with such port using the port's identity, e.g., IP address. Such communication can be any suitable form of wireless or hardware connection type communication.

Figure 3:
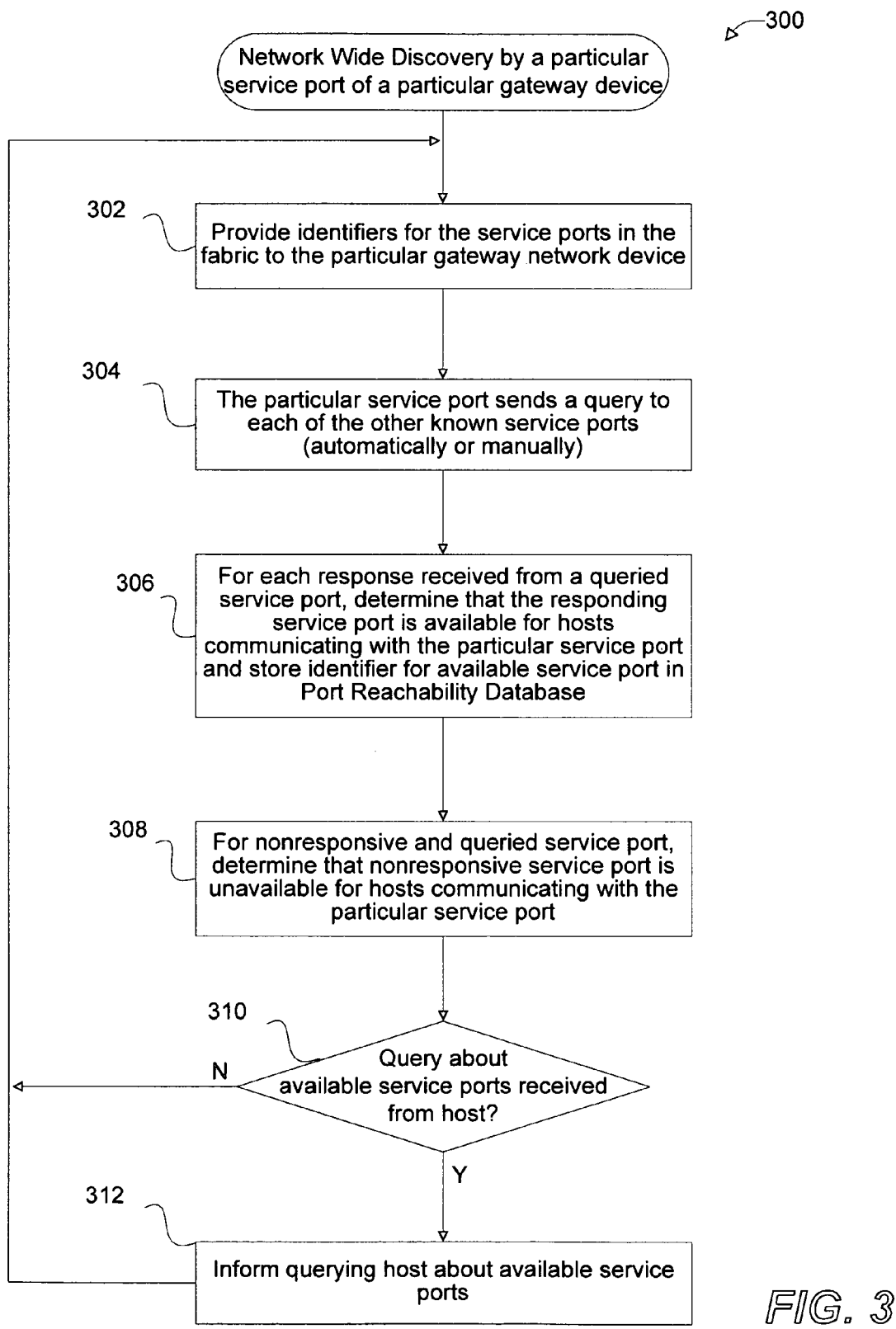
FIG. 3 is a flowchart illustrating a procedure for network wide discovery of available service ports in accordance with one embodiment of the present invention.

However, in order to access any accessible or available service ports, each host needs to know an identity of such available service ports. Any suitable mechanism may be utilized for discovering service ports that are available for a particular host. FIG. 3 is a flowchart illustrating a procedure 300 for network wide discovery of available service ports in accordance with one embodiment of the present invention. This network wide discovery procedure 300 is described as being implemented by a particular service port of a particular gateway switch of a SAN. Of course, other types of network devices may implement such procedure. Additionally, this discovery procedure 300 may be implemented for each service port of each gateway device of a SAN.

Initially, identifiers for the service ports in the fabric are provided to the particular gateway network device in operation 302. That is, it is assumed that the service ports within the SAN are known to each gateway device. This awareness may be accomplished in any suitable manner. For example, each gateway switch may obtain knowledge about other service ports in the fabric by implementation of a general propagation protocol, such as the Cisco Fabric Services (CFS) protocol. CFS generally provides a mechanism for sending any type of data to all switches in the entire fabric. For instance, each switch is configured to flood information regarding its services ports, such as identifiers and service types for each port, and any switch which receives such information is also configured to flood such information. In the example of FIG. 2, gateway device 204 is aware of GW_1 through GW_4 and their respective identifiers. For instance, GW_1 is identified by IP address 1.1.1.1; GW_2 is identified by IP address 1.1.1.2; GW_3 is identified by IP address 2.2.2.1; and GW_4 is identified by IP address 2.2.2.2.

Figure 4:
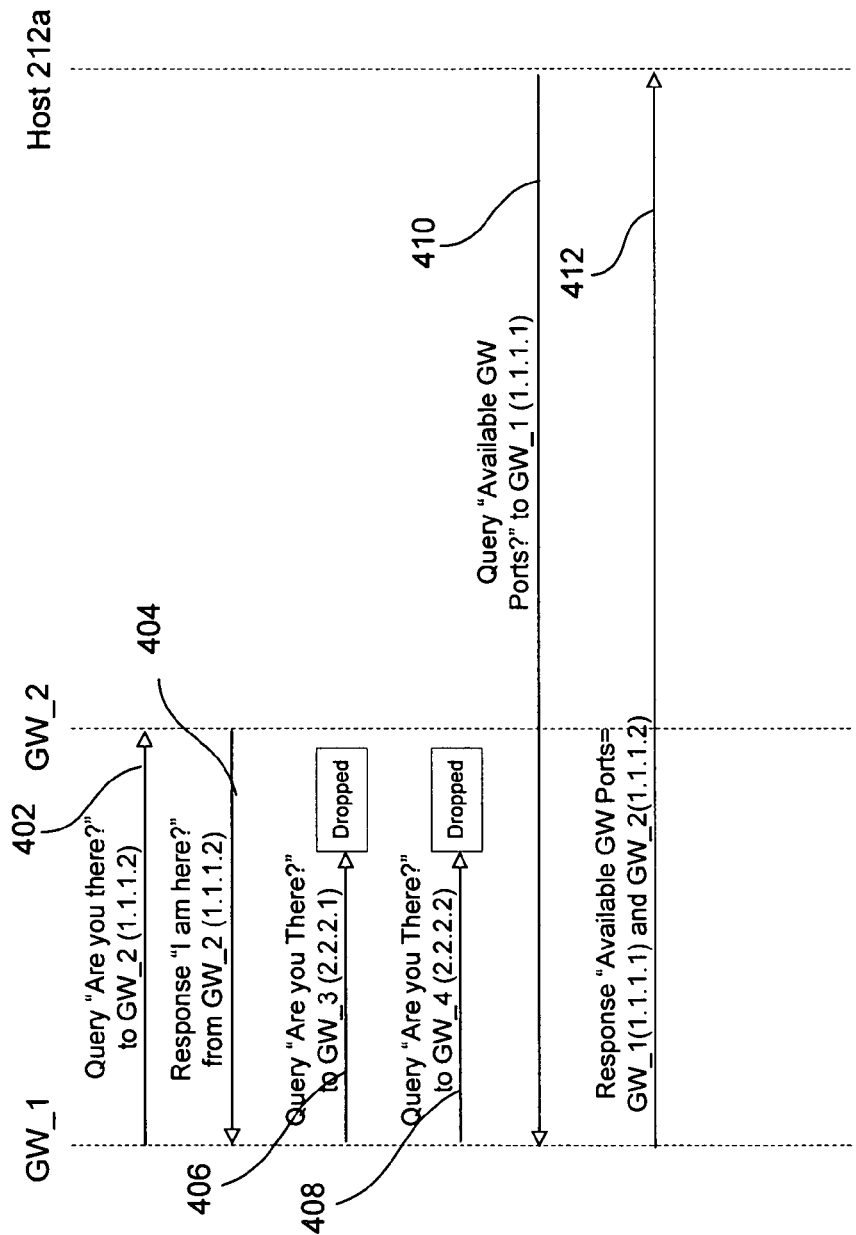
FIG. 4 is a communication diagram illustrating an example implementation of one embodiment of the present invention with respect to port GW_1 of the gateway device of FIG. 2.

The particular service port, which is implementing the discovery procedure 300, may then send a query to each of the other known service ports, e.g., automatically or manually, in operation 204. This query generally asks whether the receiving device is there and able to respond to the querying service port. FIG. 4 is a communication diagram illustrating an example implementation of one embodiment of the present invention with respect to port GW_1 of the gateway device 204 of FIG. 2. In this example, gateway device 204 is aware of the identifiers for GW_1 through GW_4. Thus, service port GW_1 will send queries to each of the other ports of which it is aware, such as ports GW_2 through GW_4. As shown in FIG. 4, port GW_1 first sends a query "are you there?" 402 to port GW_2. The querying port GW_1 also sends a query 406 to port GW_3 and a query 408 to GW_4. These three queries 402, 406, and 408 may be sent in any order to their respective other ports GW_2, GW_3, and GW_4. In another embodiment, the queries may be sent together in a multicast message.

The querying port then waits for a response from each queried port. For example, the querying port may wait a predetermined period of time for the queried ports GW2 through GW_4 to respond to their respective queries. Referring back to the procedure of FIG. 3, for each response received from a queried service port, it is then determined that the responding service port is available for hosts communicating with the querying service port and an identifier is stored for the available service port in a Port Reachability Database in operation 306. An identifier for the querying port is also stored in such database. In the example of FIGS. 2 and 4, queried port GW_2 sends a response 404 in the form of "I am here" to querying port GW_1. In this example, an identifier for GW_1 and GW_2 are stored in the Port Reachability Database for GW_1. In effect, each querying service port maintains a list of available service ports in the same "cloud" as the querying service port. In this example, both service ports GW_1 and GW_2 belong to the same cloud and will maintain the same list of available service ports in each of their Port Reachability Databases. However, this is not a requirement and each service port of a same gateway device can belong to different network clouds, such as different LAN's or VLANs.

For a non-responsive and queried service port, it is determined that the non-responsive service port is unavailable for hosts communicating with a particular service port in operation 308. In the example of FIGS. 2 and 4, the two queries 406 and 408 for ports GW_3 and GW_4 are dropped because these ports GW_3 and GW_4 are not reachable by port GW_1. That is, ports GW_3 and GW_4 are not reachable by the port GW_1 of gateway device 204 since GW_3 and GW_4 are in a LAN segment that is not coupled to the port GW_1. It is assumed that ports that are not reachable by the querying port are also not available to hosts that can communicate with such querying port, and ports that are reachable by the querying port are also reachable by such hosts. Thus, any host that can query GW_1 can be given a list of other ports that are available to the querying host.

Referring to the illustrated embodiment of FIG. 3, it is then determined whether a query about available service ports have been received from a host in operation 310. For example, a host can be initially configured with a particular service port and send a query to such service port. If a query has not been received the procedure 300 repeats. If a query is received from a host, the query and host is then informed about the available service ports in operation 312. Thus, when a host such as host 212a then sends a query 410 for "available GW ports?" to GW_1, the port GW_1 sends a response 412 that includes available port identifiers GW_1(1.1.1.1) and GW_2(1.1.1.2) to host 212a. A particular host may send a query in number of times based on any suitable parameter, such as after expiration of predetermined period of time.

The operations 302 through 306 for discovering available ports may be triggered in any suitable manner. In one embodiment, the queries for discovering available ports are triggered automatically by a port address change or a port interface state change (e.g., enabled to disabled or visa versa). In another embodiment, the SAN may include redundant router groups which implement a virtual router protocol, such as HSRP (Hot Standby Router Protocol) or VRRP (Virtual Router Redundancy Protocol). A reconfiguration of a redundant router group may also automatically trigger each service port of each gateway device to send queries to all known service ports. Alternatively, a discovery process may be triggered manually by an administrator for any suitable purpose, e.g., an external event that affects port availability of which the gateway device is unaware.

Embodiments of the present invention provide several advantages. For example, the discovery techniques require minimal manual configuration of the available service ports for the different hosts of one or more different network segments. Additionally, automatic discovery techniques can dynamically determine available ports for a particular network segment as port availability alters over time and inform the host of the particular network segment without additional manual configuration of such hosts. Thus, hosts can be provided with the most current service port availability and efficiently utilize all available ports.

The techniques of the present invention may be implemented in any suitable combination of hardware and software. For example, they can be implemented in an operating system kernel, in a separate user process, in a library package bound into network applications, on a specially constructed machine, or on a network interface card. In a specific implementation, they are implemented on a fabric switch of a storage area network.

In one implementation, the switch includes at least one memory device and at least one processor. The memory and processor are operable to perform any of the above described techniques, as well as standard switching/routing operations, virtualization management, zone management, etc.

Figure 5:
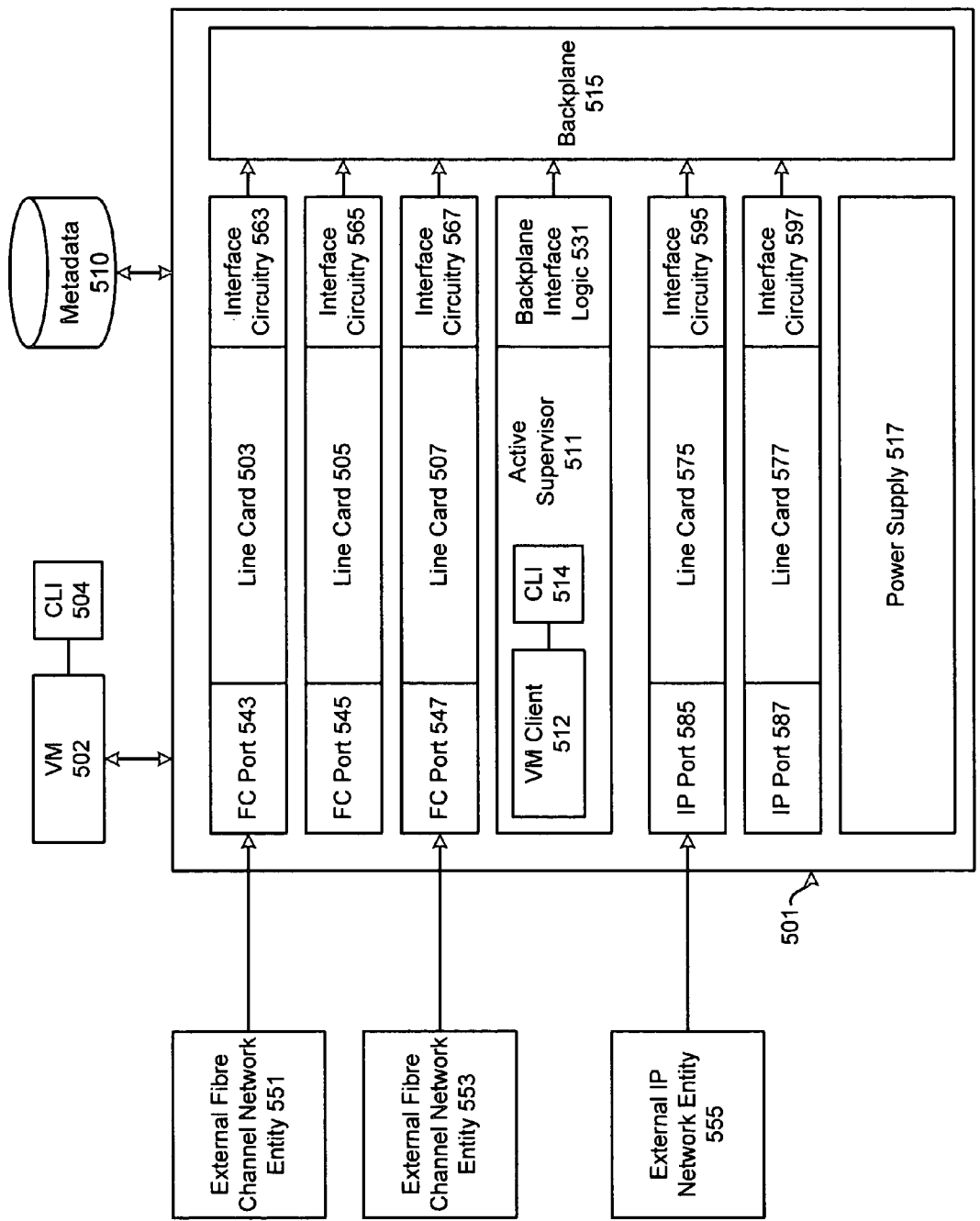
FIG. 5 is a diagrammatic representation of one example of a fibre channel switch that can be used to implement techniques of the present invention.

FIG. 5 is a diagrammatic representation of one example of a fibre channel switch 501 that can be used to implement techniques of the present invention. Although one particular configuration will be described, it should be noted that a wide variety of switch and router configurations are available. The switch 501 may include, for example, at least one interface for communicating with one or more virtual manager(s) 502. In at least one implementation, the virtual manager 502 may reside external to the switch 501, and may also be accessed via a command line interface (CLI) 504. The switch 501 may include at least one interface for accessing external metadata information 510.

The switch 501 may include one or more supervisors 511 and power supply 517. According to various embodiments, the supervisor 511 has its own processor, memory, and/or storage resources. Additionally, the supervisor 511 may also include one or more virtual manager clients (e.g., VM client 512), and which may be adapted, for example, for facilitating communication between the virtual manager 502 and the switch. The supervisor's VM clients may also each be accessed via a command line interface (CLI), e.g., 514.

Figure 6:
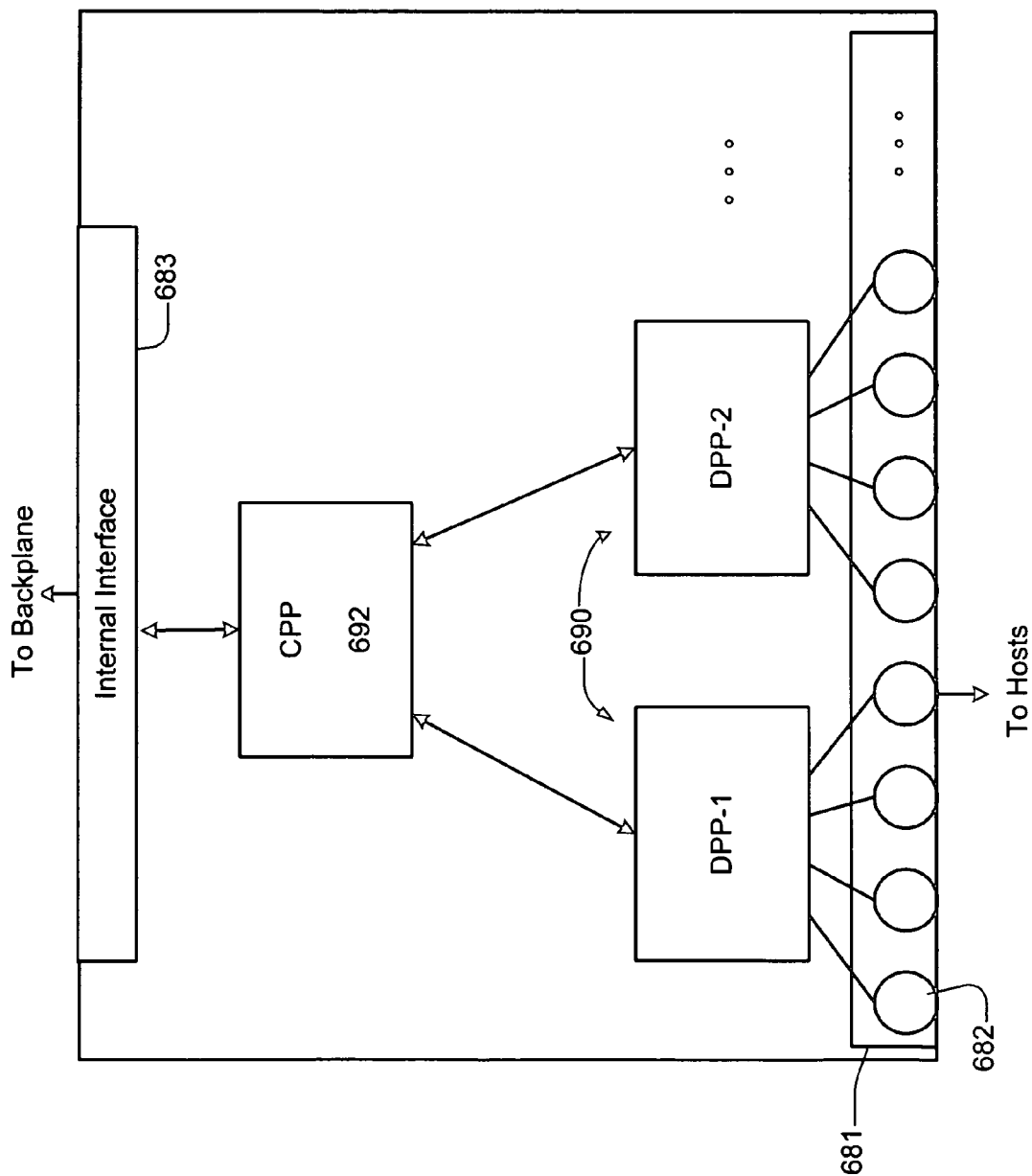
FIG. 6 is a block diagram illustrating a portion of an exemplary switch or intelligent line card in which various embodiments of the present invention may be implemented.

Line cards 503, 505, and 507 can communicate with an active supervisor 511 through interface circuitry 563, 565, and 567 and the backplane 515. According to various embodiments, each line card includes a plurality of ports that can act as either input ports or output ports for communication with external fibre channel network entities 551 and 553. An example of at least a portion of a line card is illustrated in FIG. 6 of the drawings.

The backplane 515 can provide a communications channel for all traffic between line cards and supervisors. Individual line cards 503 and 507 can also be coupled to external fibre channel network entities 551 and 553 through fibre channel ports 543 and 547.

External fibre channel network entities 551 and 553 can be nodes such as other fibre channel switches, disks, RAIDS, tape libraries, or servers. The fibre channel switch can also include line cards 575 and 577 with IP ports 585 and 587. In one example, IP port 585 is coupled to an external IP network entity 555. The line cards 575 and 577 also have interfaces 595 and 597 to the backplane 515.

It should be noted that the switch can support any number of line cards and supervisors. In the embodiment shown, only a single supervisor is connected to the backplane 515 and the single supervisor communicates with many different line cards. The active supervisor 511 may be configured or designed to run a plurality of applications such as routing, domain manager, system manager, port manager, FLOGI server, utility applications, etc. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

FIG. 6 is a block diagram illustrating a portion of an exemplary switch or intelligent line card in which various embodiments of the present invention may be implemented. According to a specific embodiment, switch portion 680 of FIG. 6 may be implemented as one of a plurality of line cards residing in a fibre channel switch such as that illustrated in FIG. 5, for example. In at least one implementation, switch portion 680 may include a plurality of different components such as, for example, at least one external interface 681, at least one data path processor (DPP) 690, at least one control path processor (CPP) 692, at least one internal interface 683, etc.

As shown in the example of FIG. 6 the external interface of 681 may include a plurality of ports 682 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI or iSCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 682 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 6, switch portion 680 may also include a control path processor (CPP) 692 configured or designed to perform control path processing for storage virtualization. In at least one implementation, functions performed by the control path processor may include, for example, calculating or generating virtual-to-physical (V2P) mappings, processing of port login and process login for volumes; hosting iPort VM clients which communicate with volume management (VM) server(s) to get information about the volumes; communicating with name server(s); etc.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of discovering service ports in a storage area network (SAN), the method comprising:
   (a) sending an availability query from a first service port of the first gateway device to each of a plurality of other service ports;
   (b) for each availability response that is received at the first service port from a responding one of the other service ports in response to an availability query, determining that such responding other service port is communicatively available for providing a service, for communicating with one or more devices of the SAN, to a particular host that is outside the SAN and implements internet protocol (IP) and not a fibre channel protocol, as implemented by the SAN, and storing the identifier for such responding other service port; and
   (c) when a port query from the particular host to communicate with a particular device of the SAN is received at the first service port, sending a port response from the first service port to the particular host so as to specify that the one or more responding other ports, that have been determined to be communicatively available for providing the service for communicating with the one or more devices of the SAN, are available, in addition to the first service port, to provide communication with the particular device of the SAN,
   wherein a first one of the other service ports belongs to the first gateway device and belongs to a same local area network as the first service port and a second one of the other service ports belongs to a second gateway device and belongs to a different local area network than the first service port, wherein an availability response is received from the first other service port and not from the second other service port,
   wherein the port response includes each stored identifier for each responding other service port and the identifier of the first service port, and the identifiers of the responding other service ports are stored in one or more Port Reachability databases that are associated with the first service port.

2. A method as recited in claim 1, further comprising storing the identifier of the first service port in the one or more Port Reachability databases.

3. A method as recited in claim 1, wherein the operations (a) and (b) are triggered automatically upon a change in a service port's address.

4. A method as recited in claim 1, wherein operations (a) and (b) are triggered automatically upon a change in a service port's state.

5. A method as recited in claim 1, wherein operations (a) and (b) are triggered automatically upon a change in a reconfiguration of a redundant router group.

6. A method as recited in claim 1, wherein operations (a) and (b) are triggered manually by a user.

7. An apparatus for discovering service ports in a storage area network (SAN), comprising:
   one or more processors;
   one or more memory, wherein at least one of the processors and memory are adapted for:
   (a) sending an availability query from a first service port of a first gateway device to each of a plurality of other service ports;
   (b) for each availability response that is received at the first service port from a responding one of the other service ports in response to an availability query, determining that such responding other service port is communicatively available for providing a service, for communicating with one or more devices of the SAN, to a particular host that is outside the SAN and implements internet protocol (IP) and not a fibre channel protocol, as implemented by the SAN, and storing the identifier for such responding other service port; and
   (c) when a port query from the particular host to communicate with the particular device of the SAN is received at the first service port, sending a port response from the first service port to the particular host so as to specify that the one or more responding other ports, that have been determined to be communicatively available for providing the service for communicating with the one or more devices of the SAN, are available, in addition to the first service port, to provide communication with the particular device of the SAN,
   wherein a first one of the other service ports belongs to the first gateway device and belongs to a same local area network as the first service port and a second one of the other service ports belongs to a second gateway device and belongs to a different local area network than the first service port wherein an availability response is received from the first other service port and not from the second other service port,
   wherein the port response includes each stored identifier for each responding other service port and the identifier of the first service port, and the identifiers of the responding other service ports are stored in one or more Port Reachability databases that are associated with the first service port.

8. An apparatus as recited in claim 7, wherein at least one of the processors and memory are further adapted for storing the identifier of the first service port in the one or more Port Reachability databases.

9. An apparatus as recited in claim 7, wherein operations (a) and (b) are triggered automatically upon a change in a service port's address.

10. An apparatus as recited in claim 7, wherein operations (a) and (b) are triggered automatically upon a change in a service port's state.

11. An apparatus as recited in claim 7, wherein operations (a) and (b) are triggered automatically upon a change in a reconfiguration of a redundant router group.

12. An apparatus as recited in claim 7, wherein operations (a) and (b) are triggered manually by a user.

13. A system for discovering service ports in a storage area network (SAN), comprising:
   a storage area network (SAN) having a plurality of storage devices for storing and retrieving data and a plurality of network devices through which one or more of the storage devices can be accessed by one or more hosts, wherein the SAN implements a fibre channel protocol and wherein the network devices include at least one gateway device having one or more service ports that are each coupled to a network segment that implements an internet protocol and not a fibre channel protocol;

a first network segment having a plurality of first hosts, wherein a first set of one or more service ports are configured to communicate with the first network segment;

a second network segment having a plurality of second hosts, wherein a second set of one or more service ports are configured to communicate with the second network segment and not communicate with the first network segment, wherein the first set of service ports is not configured to communicate with the second network segment;

wherein at least a first service port of a first gateway device is operable to:

send an availability query from the first service port of the first gateway device to each of the other service ports;

for each availability response that is received at the first service port from a responding one of the other service ports in response to an availability query, determine that such responding other service port is communicatively available for providing a service, for communicating with one or more devices of the SAN, to a particular host that is outside the SAN and implements internet protocol (IP) and not a fibre channel protocol, as implemented by the SAN, and store the identifier for such responding other service port; and when a port query from the particular host to communicate with a particular device of the SAN is received at the first service port, send a port response from the first service port to the particular host so as to specify that the one or more responding other ports, that have been determined to be communicatively available for providing the service for communicating with the one or more devices of the SAN, are available, in addition to the first service port, to provide communication with the particular device of the SAN, wherein a first one of the other service ports belongs to the first gateway device and belongs to a same local area network as the first service port and a second one of the other service ports belongs to a second gateway device and belongs to a different local area network than the first service port, wherein an availability response is received from the first other service port and not from the second other service port, wherein the port response includes each stored identifier for each responding other service port and the identifier of the first service port, and the identifiers of the responding other service ports are stored in one or more Port Reachability databases that are associated with the first service port.

14. At least one computer readable storage medium having computer program instructions stored thereon that are arranged to perform the following operations:

sending an availability query from a first service port of a first gateway device in a storage area network (SAN) to each of a plurality of other service ports;

for each availability response that is received at the first service port from a responding one of the other service ports in response to an availability query, determining that such responding other service port is communicatively available for providing a service, for communicating with one or more devices of the SAN, to a particular host that is outside the SAN and implements internet protocol (IP) and not a fibre channel protocol, as implemented by the SAN, and storing the identifier for such responding other service port; and when a port query from the particular host to communicate with a particular device of the SAN is received at the first service port, sending a port response from the first service port to the particular host so as to specify that the one or more responding other ports, that have been determined to be communicatively available for providing the service for communicating with the one or more devices of the SAN, are available, in addition to the first service port, to provide communication with the particular device of the SAN, wherein a first one of the other service ports belongs to the first gateway device and belongs to a same local area network as the first service port and a second one of the other service ports belongs to a second gateway device and belongs to a different local area network than the first service port, wherein an availability response is received from the first other service port and not from the second other service port, wherein the port response includes each stored identifier for each responding other service port and the identifier of the first service port, and the identifiers of the responding other service ports are stored in one or more Port Reachability databases that are associated with the first service port.

* * * * *